United States Patent
Buetow et al.

(10) Patent No.: US 11,039,572 B1
(45) Date of Patent: Jun. 22, 2021

(54) MULTI-POSITIONAL STALK STOMPER

(71) Applicant: Pride Solutions, LLC, Hutchinson, MN (US)

(72) Inventors: Justin D. Buetow, Hutchinson, MN (US); Benjamin W. Wick, Hutchinson, MN (US)

(73) Assignee: Pride Solutions, LLC, Hutchinson, MN (US)

( * ) Notice: Subject to any disclaimer, the term of this patent is extended or adjusted under 35 U.S.C. 154(b) by 27 days.

(21) Appl. No.: 16/379,770

(22) Filed: Apr. 9, 2019

Related U.S. Application Data

(60) Provisional application No. 62/654,847, filed on Apr. 9, 2018.

(51) Int. Cl.
| | | |
|---|---|---|
| *A01D 45/02* | (2006.01) | |
| *A01D 34/835* | (2006.01) | |
| *A01D 41/14* | (2006.01) | |
| *A01B 39/22* | (2006.01) | |
| *A01B 35/20* | (2006.01) | |

(52) U.S. Cl.
CPC ............ *A01D 45/021* (2013.01); *A01B 39/22* (2013.01); *A01D 34/8355* (2013.01); *A01D 41/14* (2013.01); *A01B 35/20* (2013.01)

(58) Field of Classification Search
CPC .. A01D 34/8355; A01D 45/022; A01D 82/00; A01D 82/02; A01D 43/10; A01D 43/102; A01D 43/107; A01D 45/021; A01D 41/14; A01B 39/22; A01B 35/20; A01B 61/046; A01B 63/24
See application file for complete search history.

(56) References Cited

U.S. PATENT DOCUMENTS

| | | | | |
|---|---|---|---|---|
| 2,338,374 A | * | 1/1944 | Baldwin ................ | A01B 35/22 172/705 |
| 2,422,409 A | * | 6/1947 | Greenroyd ......... | A01D 34/8355 172/551 |
| 3,575,243 A | * | 4/1971 | Mark ..................... | A01B 35/24 172/710 |
| 3,769,783 A | * | 11/1973 | Meharry ................ | A01D 47/00 56/63 |

(Continued)

*Primary Examiner* — Thomas B Will
*Assistant Examiner* — Madeline Ivy Runco
(74) *Attorney, Agent, or Firm* — DuFault Law Firm, P.C.; Dustin R. DuFault

(57) ABSTRACT

A multi-positional stalk stomper assembly for attaching a stalk stomper to a toolbar of a farm implement comprises a mounting bracket and a pivotal shoe assembly. The mounting bracket is adaptable to be attached to the toolbar of the farm implement and includes a rectangular plate, the plate having first and second major sides, the first side engageable with the toolbar. A first connecting member outwardly extends perpendicular from the second major side of the plate. The shoe assembly includes a torsion spring assembly, a second connecting member outwardly extending from the torsion spring assembly, the second connecting member mateable with the first connecting member, a shoe bracket pivotally connected to the torsion spring assembly, and a downwardly extending shoe attached to the shoe bracket. Upon mating the second connecting member with the first connecting member, the shoe assembly is lockable to the mounting bracket at a selected position.

9 Claims, 5 Drawing Sheets

(56) References Cited

U.S. PATENT DOCUMENTS

| | | | | |
|---|---|---|---|---|
| 4,574,891 A * | 3/1986 | Williamson | A01B 39/22 | 172/602 |
| 4,815,544 A * | 3/1989 | Good | A01B 21/086 | 172/430 |
| 5,669,451 A * | 9/1997 | Noonan | A01B 35/06 | 172/497 |
| 8,745,963 B1 * | 6/2014 | Shoup | A01D 75/187 | 56/17.2 |
| 8,806,846 B2 * | 8/2014 | Hyronimus | A01D 63/00 | 56/314 |
| 8,979,106 B2 * | 3/2015 | Benoit | A01D 34/8355 | 280/160 |
| 9,095,093 B2 * | 8/2015 | Hyronimus | F16C 11/04 | |
| 9,730,374 B2 * | 8/2017 | Wick | A01B 63/002 | |
| 9,743,587 B2 * | 8/2017 | Lohrentz | A01D 34/8355 | |
| 9,867,335 B1 * | 1/2018 | Obbink | A01D 45/021 | |
| 10,231,379 B2 * | 3/2019 | Lohrentz | A01D 34/8355 | |
| 2006/0000622 A1 * | 1/2006 | Cresswell | A01C 5/06 | 172/705 |
| 2012/0261149 A1 * | 10/2012 | Schmidt | A01C 7/006 | 172/558 |
| 2013/0019581 A1 * | 1/2013 | Hyronimus | A01B 61/046 | 56/314 |
| 2013/0177348 A1 * | 7/2013 | Hyronimus | A01D 34/8355 | 403/164 |
| 2013/0192857 A1 * | 8/2013 | Shoup | A01D 75/187 | 172/833 |
| 2015/0096773 A1 * | 4/2015 | Miller | A01D 34/8355 | 172/540 |
| 2015/0250088 A1 * | 9/2015 | Sandberg | A01B 61/046 | 172/1 |
| 2016/0066504 A1 * | 3/2016 | Holman | A01D 34/8355 | 56/504 |
| 2016/0165787 A1 * | 6/2016 | Claussen | E02F 3/241 | 172/548 |
| 2016/0174454 A1 * | 6/2016 | Phan | A01B 69/008 | 701/301 |
| 2016/0183468 A1 * | 6/2016 | Lohrentz | A01D 34/8355 | 56/51 |
| 2017/0021486 A1 * | 1/2017 | Reissmann | A01G 29/00 | |
| 2017/0064907 A1 * | 3/2017 | Westlake | A01D 78/1078 | |
| 2017/0208732 A1 * | 7/2017 | Horsch | A01B 61/046 | |
| 2018/0020617 A1 * | 1/2018 | Weitenberg | A01D 34/71 | 56/503 |

* cited by examiner

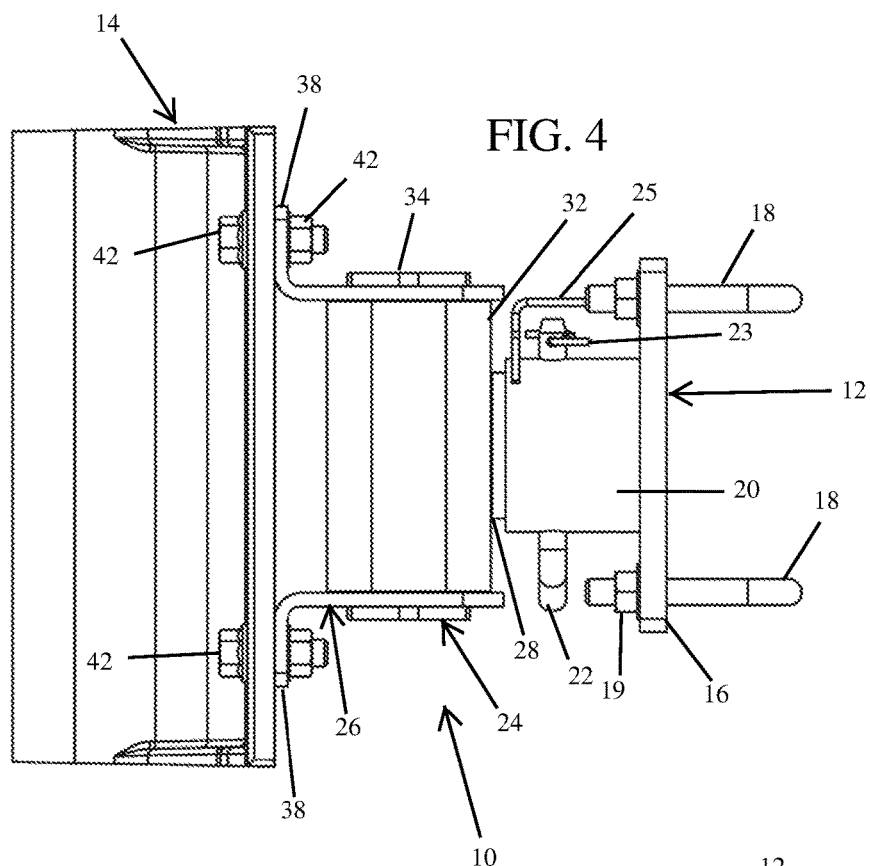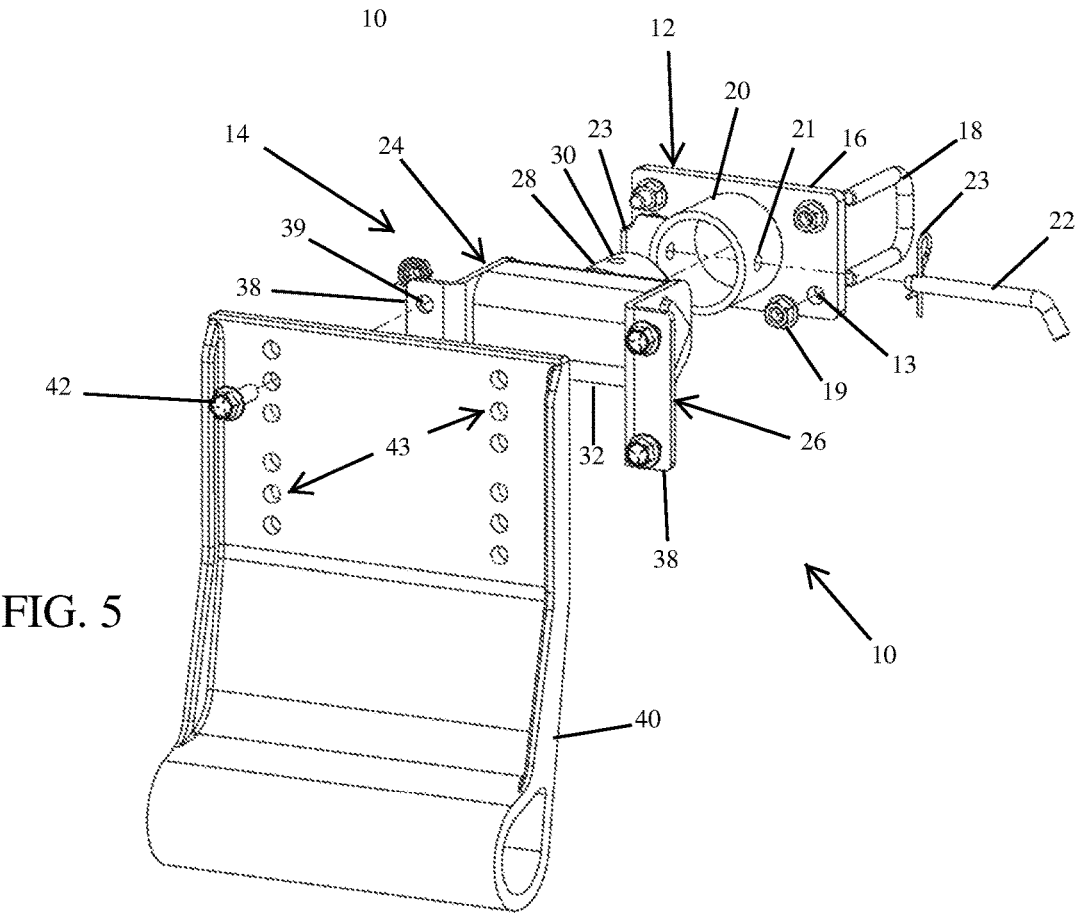

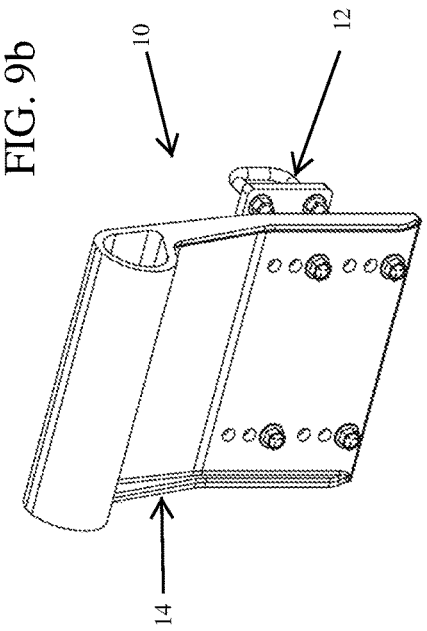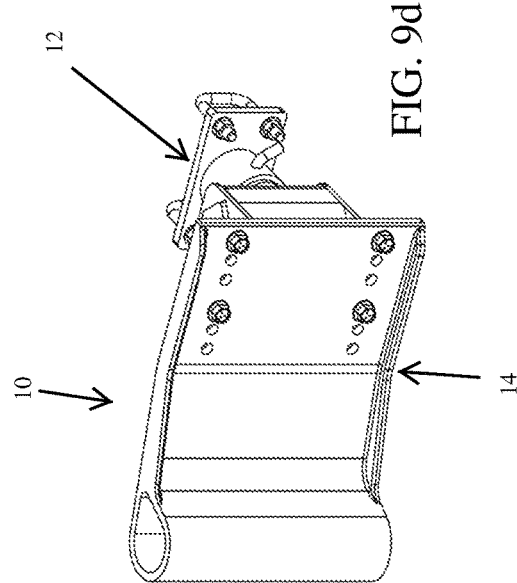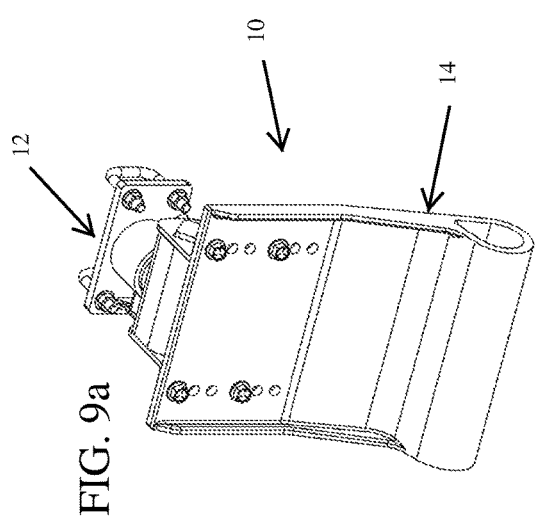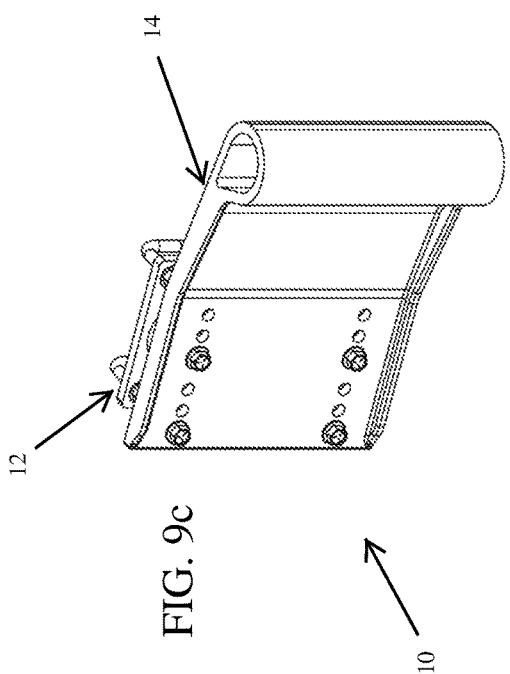

MULTI-POSITIONAL STALK STOMPER

CROSS-REFERENCE TO RELATED APPLICATION

The present application claims a benefit of similarly entitled U.S. Provisional Application No. 62/654,847 filed Apr. 9, 2018. The entirety of the foregoing application is hereby incorporated herein by reference.

BACKGROUND OF THE INVENTION

Farm implements have been used since ancient times. Since the days of motor-powered vehicles, farm implements have been attached to tractors, combines, trucks and other mobile vehicles. These implements till the ground, plant various seeds, apply weed treatments and pesticides, harvest crops, and many other tasks. Each different implement may have a specific form-factor. Each different implement may require a specific position or attitude with respect to that upon which it is designed to operate. For example, when harvesting corn, a corn header contacts and cuts the stalk prior to the cut stalk contacting a vehicle's tires, such as the tires of a combine or tractor. The attitude of the corn stalk in the vertical position may result in the damage to the tires, especially after prolonged contact.

There exist in the art several examples of devices commonly referred to as "stalk stompers" whose purpose is to deflect the vertical positioning of the cut corn stalk prior to contact with the tires of a vehicle. With the cut corn stalk deflected, preferably at in a direction such that the top of the cut corn stalk does not come into contact with the tire of the combine or tractor, damage to the tires is thus prevented. However, such prior art examples tend to be bulky, having a variety of relatively heavy parts, thereby making the prior art stalk stompers burdensome to install and manipulate, especially from a working to non-working, or transport, position. Being able to easily manipulate the stalk stomper from the working to the non-working position, and vice versa, is advantageous when moving the implement to which the stalk stompers are attached from field to field, or from field to home, and vice versa, as the stalk stompers themselves can be obtrusive and suspect to damage during transport. If the stalk stomper is not easily convertible from the working to non-working position, the user may neglect to do so when moving from field to field, especially during a busy harvest when time is of the essence. This may lead to the damaging of the stalk stompers during transport.

There therefore exists a need in the art to provide a stalk stomper which is not bulky, is not burdensome to install, and can easily be manipulated from a working to non-working position.

BRIEF SUMMARY OF INVENTION

A multi-positional stalk stomper in accordance with the present invention generally includes a mounting bracket attachable to a toolbar of a farm implement or vehicle, and a shoe assembly supported by the mounting bracket. The mounting bracket includes a base plate adapted for attachment to the toolbar of the farm implement. Extending from the base plate is a female connecting member which contains cooperating apertures through which a fastening pin may be disposed.

The shoe assembly includes a torsion spring assembly attachable to the mounting bracket, which in turn supports a shoe bracket. The torsion spring assembly attaches to the mounting bracket by means of a male connecting member, which is disposable within the female member of the mounting bracket. The male member includes two sets of corresponding apertures, each set preferably offset from one another by 90 degrees. Upon positioning the male member to seat within the female member, a pin is inserted through the apertures to lock the male member to the female member, and thereby position the shoe assembly in one of four selected positions, namely a first working position and three non-working transport positions. The shoe assembly further includes a shoe mounting bracket to which a shoe is attached.

The torsion spring assembly includes a rectangular outer housing. The male member attaches to and extends from one side of the outer housing. An inner metal bar disposes within the housing and rests upon four separate lengths of rubber cord disposed along the inner corners of the housing. The inner metal bar thus engages against each length of rubber cord wherein such fitment permits limited pivotal movement of the inner bar relative to the metal housing.

In operation, the mounting bracket is attached to the tool bar of the implement, and in turn the shoe assembly is attached to the mount bracket by inserting the male member into the female member, which are then locked at the selected position with the pin. In the first working position, the shoe extends in a generally downward direction. During use, with the combine or farm implement moving in a forward direction, the stalk stomper shoe contacts and pushes forward cut corn stalks in the immediate path of a tire, thereby minimize potential damage to the tire caused by the cut corn stalk. In the event the stalk stomper shoe encounters large debris, the torsion spring assembly permits limited pivotal movement of the stalk stomper shoe relative to the housing, thereby overcoming the large debris without damaging the stalk stomper. When transporting the farm implement, the user can easily position the stalk stomper assembly to one of the three non-working transport positions by pulling the pin to unlock the shoe assembly from the mounting bracket, pivoting the shoe assembly to one of the three non-working positions, wherein the shoe assembly is again locked to the mounting bracket by inserting the pin.

BRIEF DESCRIPTION OF THE DRAWINGS

The following figures are used herein in conjunction with the specification to assist in understanding the invention. The Figures are as follows:

FIG. 4 a top view of the multi-positional stalk stomper in accordance with the present invention.

FIG. 5 is an exploded view of the multi-positional stalk stomper in accordance with the present invention.

FIG. 9a is perspective view of the multi-positional stalk stomper in a first working position.

FIG. 9b is perspective view of the multi-positional stalk stomper in a first transport position.

FIG. 9c is perspective view of the multi-positional stalk stomper in a second transport position.

FIG. 9d is perspective view of the multi-positional stalk stomper in a third transport position.

DESCRIPTION OF THE INVENTION

Figures 1, 2:
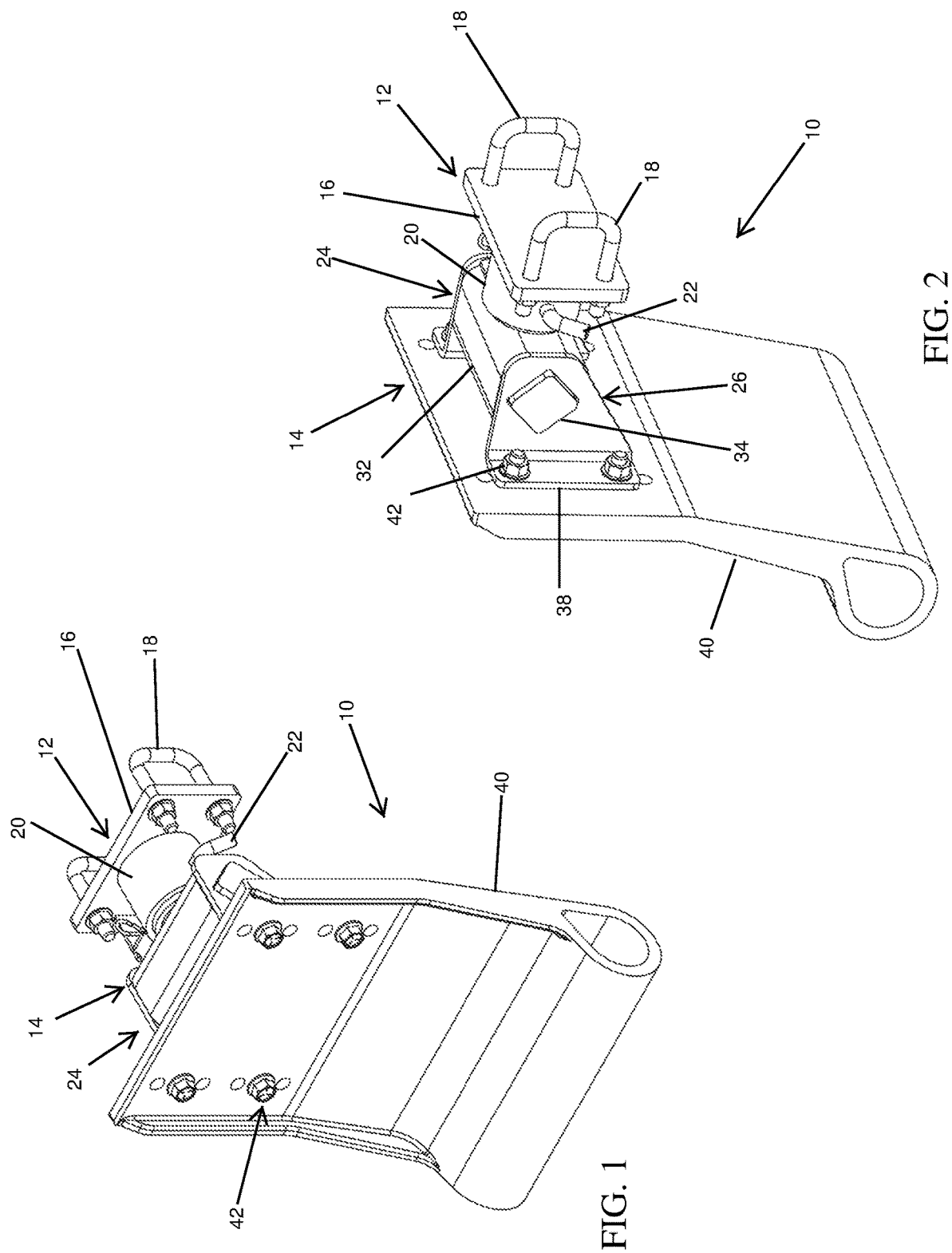
FIG. 1 is a front perspective view of the multi-positional stalk stomper in accordance with the present invention.
FIG. 2 is a left-rear perspective view of the multi-positional stalk stomper in accordance with the present invention.
Figure 3:
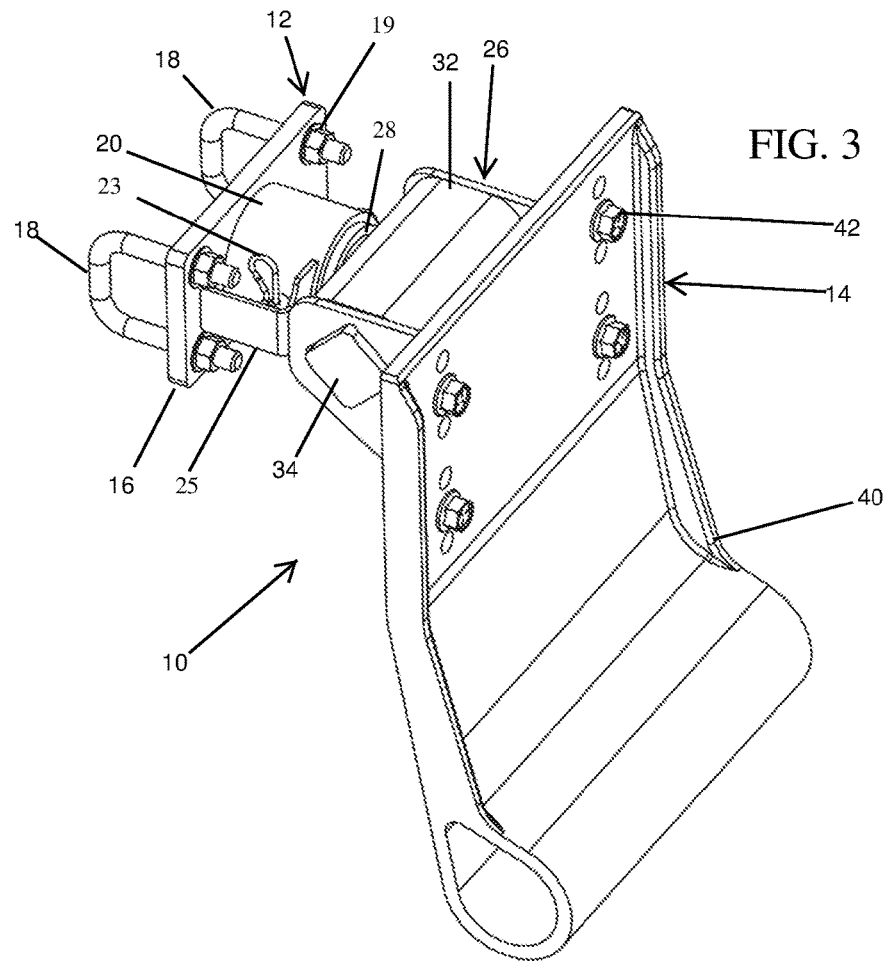
FIG. 3 is a right perspective view of the multi-positional stalk stomper in accordance with the present invention.

Referring to FIGS. 1 through 3, a multi-positional stalk stomper in accordance with the present invention is generally indicated at 10. The stalk stomper generally includes a mounting bracket 12 attachable to a toolbar of a farm implement or vehicle (not shown), and a shoe assembly 14 rotatably supported by the mounting bracket 12.

As best illustrated in FIGS. 4 and 5, the mounting bracket 12 includes a base plate 16 through which are drilled four holes 13, each positioned at a corner. Left- and right-hand positioned holes 13, respectively, support a U-shaped threaded fastener 18 on each side, which permits the base plate 16 to be attached to the toolbar of the farm implement or vehicle with the aid of threaded nuts 19, as is known in the art. Preferably, the farm implement is a corn head, and the base plate 16 attaches directly to the corn head at a position there along such that the stalk stomper 10 will be positioned directly forward of a path of a tire of the farm vehicle, as is also known in the art. The mounting bracket 12 further includes a round, female connecting member 20 which contains cooperating apertures 21 through which a fastening pin 22 may be disposed. The fastening pin 22 preferably has a cotter 23 to lock it into place, wherein a metal guard 25 is positioned to protect the cotter 23 from being hit by debris and being unintentionally displaced during use.

Figure 6:
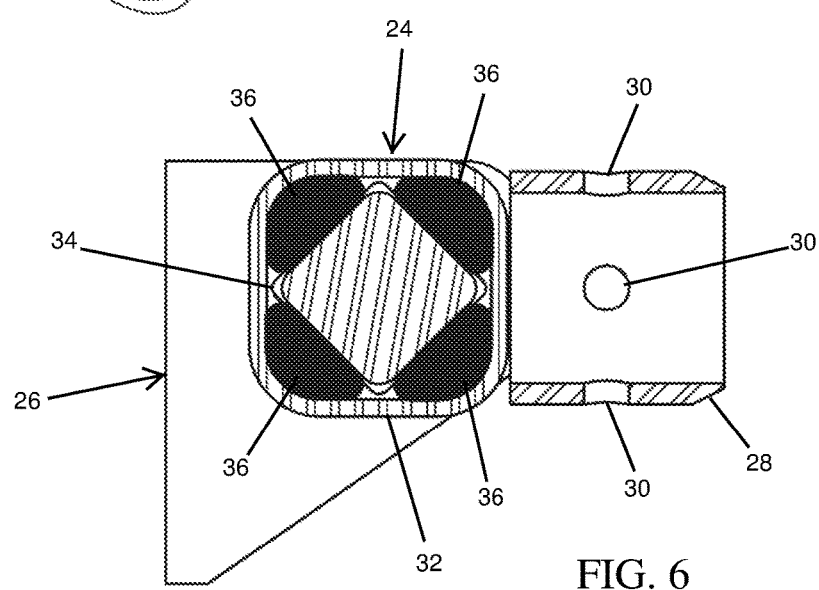
FIG. 6 is a side sectional view of the shoe assembly of the multi-positional stalk stomper in accordance with the present invention.
Figure 7:
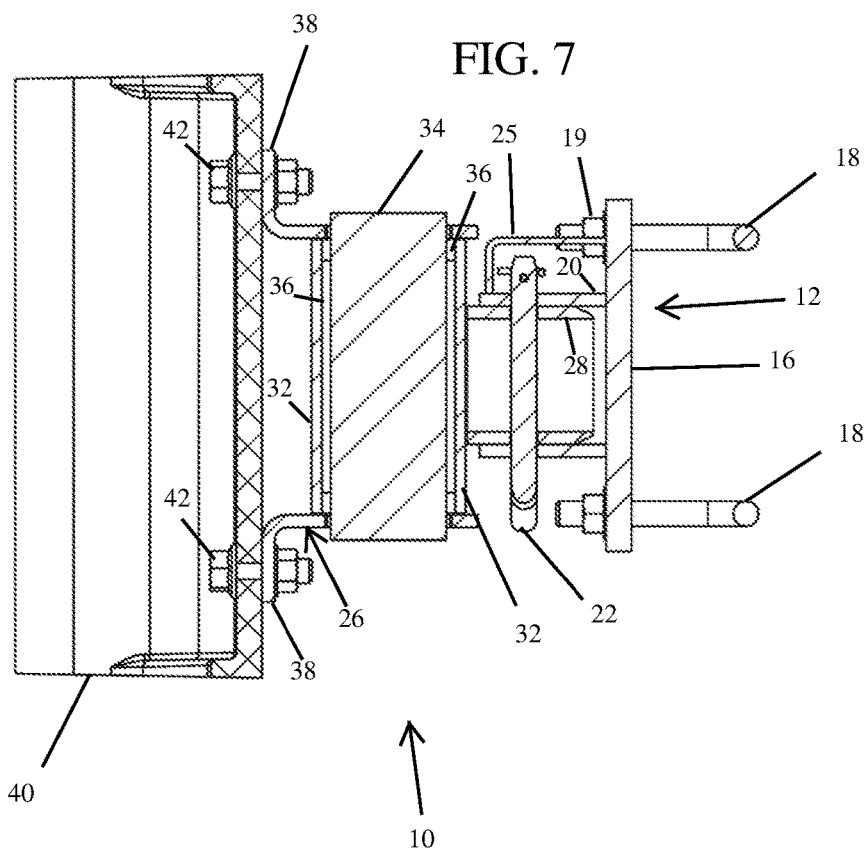
FIG. 7 is a top sectional view of the multi-positional stalk stomper in accordance with the present invention.

As illustrated in FIGS. 6 and 7, the shoe assembly 14 includes a torsion spring assembly 24 attachable to the mounting bracket 12, which in turn supports a shoe bracket 26. The torsion spring assembly 24 attaches to the mounting bracket 12 by means of a second connecting member 28, preferably a round, male member which is disposable within the female connecting member 20 of the mounting bracket 12. It should be understood, though, that it is well within the scope of the present invention to swap the positions of the female and male members, 20 and 28, respectively, such as including the male member 28 being attached to bracket 16, and female member 20 being attached to housing 32. The male member 28 includes two sets of corresponding apertures 30, each preferably offset from one another by 90 degrees. Upon positioning the male member 28 to seat within the female member 20, each set of corresponding apertures 30 of the male member 28 can be aligned with the set of cooperating apertures 21 of the female member 20, whereupon the fastening pin 22 may be disposed therethrough, and the cotter 23 set in place, to lock the male member 28 to the female member 20 at one of four selected positions, which will be discussed in greater detail later.

As best illustrated in FIG. 6, the torsion spring assembly 24 includes an outer square housing 32, preferably constructed from metal, which is attached to the male member 28. An inner elongated bar 34, also preferably constructed of metal, disposes within the metal housing 32 and is supported by four separate lengths of elastic cord 36, preferably constructed from rubber. Each length of cord 36 disposes lengthwise along a corner of the metal housing 32. The inner metal bar 34 engages against, and is supported within the metal housing 32, each length of rubber cord 36. As such, with the rubber cords 36 biasing against the inner metal bar 34, the inner bar 34 naturally remains at a home position within housing 32, but slight pivotal movement of the inner bar 34, caused by angular forces upon the inner bar 34 greater than the initial bias of the cords 36, is permitted. In that regard, the fitment of the inner metal bar 34 within the metal housing 32, supported by and against the rubber cords 36, permits pivotal, but not rotational, movement of the inner metal bar 34 relative to the metal housing 32.

The shoe assembly 14 further includes the shoe mounting bracket 26 attached to each end of the inner bar 32. The shoe mounting bracket 26 includes angled, downwardly extending flanges 38 containing corresponding apertures 39 to which a shoe 40 can be attached by way of fasteners 42, at a selected position. The selected position is arrived at by selecting which apertures 43, contained in the shoe 40, to mate with apertures 39 of the bracket 26. In that regard, the vertical placement of the shoe relative to the shoe mounting bracket 26 can be adjusted, which may be necessary to adjust contact of the shoe with the ground or cut corn stocks during use. The shoe 40 itself preferably contains a single, one-piece construction formed from a polymer plastic material. However, other materials, including formed metal, are well within the scope of the present invention.

Figure 8:
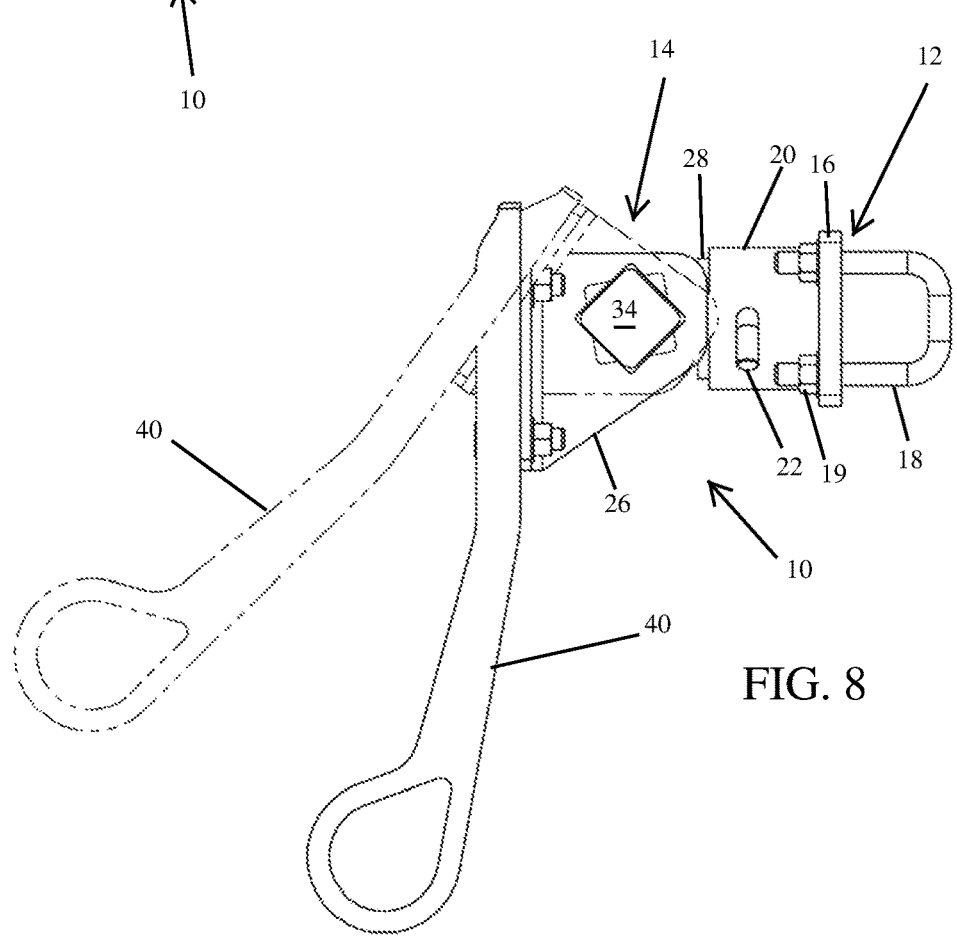
FIG. 8 is a side-view of the multi-positional stalk stomper in accordance with the present invention.

As illustrated in FIG. 8, the shoe 40 is fixedly attached to the shoe bracket 26. In the working position, the shoe 40 extends in a generally downward direction such that it may contact the ground or cut corn stocks. During operation, the shoe 40 may come into contact with large debris. If such an instance were to occur, the torsion spring assembly 24 permits the shoe bracket 26 and the shoe 40 to pivot, preferably up to 35 degrees (illustrated in dashed lines), in order to overcome the large debris without damaging either the shoe 40, the shoe assembly 14 or any other parts of the stalk stomper 10. Upon overcoming the debris, the torsion spring assembly 24 urges the shoe 40 back to the initial, natural generally downward position.

Referring now to FIGS. 9a through 9d, the stalk stomper show assembly 14 is positionable between four positions, namely a first working position and three alternative transport positions, for a total of four possible positions. In each position, placement of the mounting bracket 12, which is fixedly attached to the tool bar of the farm implement, remains the same. The first working position, as illustrated in FIG. 9a, includes the stalk stomper shoe assembly 14 positioned in a generally downward position. A first transport position, as illustrated in FIG. 9b, includes the stalk stomper shoe assembly 14 positioned in a generally upward position. A second transport position, as illustrated in FIG. 9c, includes the stalk stomper shoe assembly 14 positioned generally to the right. A third transport position, as contained in FIG. 9d, includes the stalk stomper shoe assembly 14 positioned generally to the left. Either of the three transport positions place the shoe assembly 14, and more particularly the shoe 40, in such a manner as to decrease any likelihood of either coming into unintended contact with items or objects during transport, or storage when not in use.

As previously discussed, the stalk stomper shoe assembly 14 is locked into each of the aforementioned positions by means of the locking pin 22 which is inserted through the corresponding apertures of the female member 20 and the respective cooperating apertures 30 of the male member 28. To position the stalk stomper shoe assembly 14 between each of the aforementioned positions, first the cotter 23, then pin 22 are removed whereby the stalk stomper assembly 14 is free to pivot or rotate relative to the mounting bracket 12. In so doing, the male member 28 rides within the female member 20 with minimal effort on behalf of the user to pivot the shoe assembly 14. Upon reaching the desired position, which may either be the first downward working position or one of the three non-working transport positions, apertures 21 and 30 are aligned in the selection position, the pin 22 is re-inserted through apertures 21 and 30 of the female member 20 and male member 28, respectively, wherein the cotter 23 is inserted through the pin 22, thus locking the shoe assembly 14 into the selected position.

It is recognized there are multiple variations beyond what are outlined in the detailed description to accomplish the objectives set forth by the current invention. Further alternative embodiments provide additional utility of the device for the convenience of the user. As such, although the present invention has been described with reference to preferred and alternative embodiments, workers skilled in the art will recognize that changes may be made in form and detail without departing from the spirit and scope of the invention.

The invention claimed is:

1. A multi-positional stalk stomper assembly for attaching a stalk stomper to a toolbar of a farm implement, the assembly comprising:
   a mounting bracket adaptable to be attached to the toolbar of the farm implement, the mounting bracket including:
      a rectangular plate, the plate having first and second major sides, the first side engageable with the toolbar; and
      a first connecting member outwardly extending perpendicular from the second side of the plate; and
   a shoe assembly pivotally connected to the mounting bracket, the shoe assembly including:
      a torsion spring assembly;
      a second connecting member outwardly extending from the torsion spring assembly, the second connecting member mateable with the first connecting member;
      a shoe bracket pivotally connected to the torsion spring assembly; and
      a downwardly extending shoe attached to the shoe bracket;
   wherein the first connecting member and the second connecting member each include a tubular configuration, wherein the first connecting member is adapted to receive the second connecting member to attach the shoe assembly to the mounting bracket; and
   wherein mating the first connecting member and the second connecting member, the shoe assembly is lockable to the mounting bracket at a selected position.

2. The multi-positional stalk stomper assembly of claim 1, further comprising a pin member, wherein the first connecting member and the second connecting member each include a set of corresponding apertures, wherein aligning the corresponding apertures of the first connecting member with the corresponding apertures of the second connecting member, the pin is disposable through each set of corresponding apertures to lock the first connecting member and the second connecting member together.

3. The multi-positional stalk stomper assembly of claim 2, wherein the second connecting member includes a second set of cooperating apertures offset from the first set of corresponding apertures by 90 degrees, whereby the shoe assembly is positionable between a first working position and three non-working positions.

4. The multi-positional stalk stomper assembly of claim 1, wherein the torsion spring assembly comprises:
   a housing member having an elongated square configuration, wherein the second connecting member attaches to one side of the housing member and extends perpendicularly outward therefrom;
   a plurality of elongated elastic cords disposed within the housing; and
   an inner member having an elongated square configuration disposed within the housing member, the inner member supported by the elongated elastic cords, wherein the inner member, biased by the elongated cords, is permitted to pivot relative to the housing member.

5. The multi-positional stalk stomper assembly of claim 4, wherein the shoe bracket fixedly attaches to the inner member of the torsion spring assembly, wherein the shoe bracket is permitted to pivot relative to the housing member.

6. A multi-positional stalk stomper assembly for attaching a stalk stomper to a toolbar of a farm implement, the assembly comprising:
   a mounting bracket adaptable to be attached to the toolbar of the farm implement, the mounting bracket including:
      a rectangular flat plate, the flat plate having opposing first and second major sides, the first major side engageable with the toolbar; and
      a first connecting member having a circular tubular configuration outwardly extending perpendicular from the second major side of the flat plate;
   a shoe assembly rotatably connected to the mounting bracket, the shoe assembly including:
      a torsion spring assembly, the torsion spring assembly comprising:
         a housing member having an elongated square configuration;
         a plurality of elongated elastic cords disposed within the housing; and
         an inner member having an elongated square configuration disposed within the housing member, the inner member supported by the elongated elastic cords, wherein the inner member, biased by the elongated cords, is permitted to pivot relative to the housing member;
      a second connecting member having a circular tubular configuration attached to and extending outwardly from the housing member of torsion spring assembly, wherein the first connecting member is adapted to receive the second connecting member to rotatably attach the shoe assembly to the mounting bracket;
      a shoe bracket attached to the inner member of the torsion spring assembly; and
      a downwardly extending shoe attached to the shoe bracket; and
   a pin member, wherein mating the first connecting member and the second connecting member the shoe assembly is rotatable about the mounting bracket in a plane parallel to a plane defined by the second major side of the rectangular flat plate, wherein the first connecting member and the second connecting member each include a set of corresponding apertures, wherein aligning the corresponding apertures of the first connecting member with the corresponding apertures of the second connecting member, the pin is disposable through each set of corresponding apertures to lock the first connecting member and the second connecting member together, wherein shoe assembly is locked to the mounting bracket at a selected position.

7. The multi-positional stalk stomper assembly of claim 6, wherein the second connecting member includes a second set of cooperating apertures offset from the first set of corresponding apertures by 90 degrees, whereby the shoe assembly is positionable between a first working position and three non-working positions.

8. The multi-positional stalk stomper assembly of claim 1 wherein the rectangular plate is flat.

9. A multi-positional stalk stomper assembly for attaching a stalk stomper to a toolbar of a farm implement, the assembly comprising:
- a mounting bracket adaptable to be attached to the toolbar of the farm implement, the mounting bracket including:
  - a rectangular plate, the plate having first and second major sides, the first side engageable with the toolbar; and
  - a first connecting member outwardly extending perpendicular from the second side of the plate; and
- a shoe assembly pivotally connected to the mounting bracket, the shoe assembly including:
  - a torsion spring assembly;
  - a second connecting member outwardly extending from the torsion spring assembly, the second connecting member mateable with the first connecting member;
  - a shoe bracket pivotally connected to the torsion spring assembly; and
  - a downwardly extending shoe attached to the shoe bracket;
- wherein the first connecting member and the second connecting member each include a cylindrical tubular configuration, wherein the first connecting member is adapted to receive the second connecting member to attach the shoe assembly to the mounting bracket;
- wherein mating the first connecting member and the second connecting member the shoe assembly is rotatable about the mounting bracket in a plane parallel to a plane defined by the second major side of the rectangular plate, and the shoe assembly is lockable to the mounting bracket at a selected position.

* * * * *